United States Patent
Hurmer

(10) Patent No.: US 8,437,135 B2
(45) Date of Patent: May 7, 2013

(54) HYBRID DRIVE OF A HYBRID VEHICLE

(75) Inventor: Paul Hurmer, Stuttgart (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 314 days.

(21) Appl. No.: 12/983,452

(22) Filed: Jan. 3, 2011

(65) Prior Publication Data

US 2011/0168476 A1 Jul. 14, 2011

(30) Foreign Application Priority Data

Jan. 11, 2010 (DE) .......................... 10 2010 004 713

(51) Int. Cl.
H05K 7/20 (2006.01)

(52) U.S. Cl.
USPC ........... 361/699; 361/688; 361/689; 361/707; 165/104.33

(58) Field of Classification Search .................. None
See application file for complete search history.

(56) References Cited

U.S. PATENT DOCUMENTS

| | | | | |
|---|---|---|---|---|
| 6,865,080 B2 * | 3/2005 | Radosevich et al. | .......... | 361/699 |
| 6,867,970 B2 * | 3/2005 | Muller et al. | ................. | 361/695 |
| 7,016,192 B2 * | 3/2006 | Beihoff et al. | ................ | 361/689 |
| 7,710,721 B2 * | 5/2010 | Matsuo et al. | ................ | 361/699 |
| 7,855,887 B2 * | 12/2010 | Kakuda et al. | ................ | 361/699 |
| 7,924,562 B2 * | 4/2011 | Soma et al. | .................... | 361/694 |
| 7,965,510 B2 * | 6/2011 | Suzuki et al. | ................. | 361/699 |
| 7,968,925 B2 | 6/2011 | Tokuyama et al. | | |
| 8,064,198 B2 * | 11/2011 | Higashidani et al. | .... | 361/679.53 |
| 8,159,823 B2 * | 4/2012 | Murakami | ..................... | 361/716 |
| 8,159,849 B2 | 4/2012 | Nakakima et al. | | |
| 8,212,382 B2 * | 7/2012 | Nakatsu et al. | ................ | 307/9.1 |
| 8,240,411 B2 * | 8/2012 | Nakatsu et al. | ............ | 180/65.21 |
| 2006/0208660 A1 | 9/2006 | Shinmura et al. | | |
| 2007/0246635 A1 | 10/2007 | Nakajima et al. | | |
| 2008/0251909 A1 | 10/2008 | Tokuyama et al. | | |
| 2010/0208427 A1 * | 8/2010 | Horiuchi et al. | ............... | 361/699 |
| 2011/0116235 A1 * | 5/2011 | Ryu et al. | ...................... | 361/699 |

FOREIGN PATENT DOCUMENTS

| | | |
|---|---|---|
| EP | 1 843 456 | 10/2007 |
| JP | 2004215343 | 7/2004 |
| JP | 2004254358 | 9/2004 |
| JP | 2006128546 | 5/2006 |
| JP | 2009219200 | 9/2009 |

* cited by examiner

*Primary Examiner* — Boris Chervinsky

(74) *Attorney, Agent, or Firm* — Gerald E. Hespos; Michael J. Porco; Matthew T. Hespos

(57) ABSTRACT

A hybrid drive has first and second electrical machines (12, 11) and an energy store (13). A converter (14) is assigned to the energy store (13). First and second converters (16, 15) are assigned to the first and second electrical machines (12, 11) and combine to form a modular unit (17) with a basic module (18) and a supplementary module (19). The basic module (18) has the first converter (16), cooling connections (20, 21), fasteners (24) for attachment to a body, a connection (22) for the converter (14) of the energy store (13) and a connection (23) for the first electrical machine. The supplementary module (19) is coupled to the basic module (18) and has the second converter (15) and a connection (25) the second electrical machine (11). The supplementary module (19) is cooled via the basic module (18) and coupled to the converter (14) of the energy store (13).

5 Claims, 5 Drawing Sheets

HYBRID DRIVE OF A HYBRID VEHICLE

CROSS-REFERENCE TO RELATED APPLICATION

This application claims priority under 35 USC 119 to German Patent Application No. 10 2010 004 713.9, filed on Jan. 11, 2010, the entire disclosure of which is incorporated herein by reference.

BACKGROUND OF THE INVENTION

1. Field of the Invention

The invention relates to a hybrid drive of a hybrid vehicle.

2. Description of the Related Art

Motor vehicles with a hybrid drive are known. A hybrid drive has an internal combustion engine and at least one electrical machine that can be operated as a generator or a motor. An electrical energy store interacts with the electrical machine or with each electric machine. The electrical energy store is discharged to a greater extent when the electrical machine is operated as a motor and is charged to a greater extent when the electrical machine is operated as a generator. A converter is assigned to the electrical energy store of a hybrid vehicle and a converter is assigned to each electrical machine. Space-saving integration of the converters in the motor vehicle presents problems when the hybrid drive has plural electrical machines and, accordingly, a plurality of converters assigned respectively to the electrical machines.

The invention is based on the problem of providing a novel hybrid drive of a hybrid vehicle.

SUMMARY OF THE INVENTION

The invention relates to a hybrid drive where the converters assigned to the electrical machines are combined to form a modular converter unit. The converter unit has a basic module with the converter assigned to a first electrical machine. The converter unit also has connections for cooling the converter unit, fastening means for attaching the converter unit to a body structure, a connection for making electrical contact with the converter assigned to the electrical energy store, and a connection for making electrical contact with the first electrical machine. The converter unit further has at least one supplementary module that can be coupled to the basic module and has the converter assigned to a second electrical machine. The supplementary module has a connection for making electrical contact with the respective second electrical machine. The connection can be coupled to the basic module in such a way that the respective supplementary module can be cooled via the basic module, can be attached to the body structure via the basic module and can be coupled electrically to the converter of the electrical energy store via the basic module.

A hybrid drive with plural electrical machines preferably has the converters assigned to the electrical machines combined to form a converter unit. The converter unit has a basic module that serves the purpose of mechanically attaching the converter unit to a body structure of the hybrid vehicle, electrically attaching the converter unit to a converter of the electrical energy store and attaching the converter unit to a cooling circuit. The basic module preferably comprises a converter that interacts with a first electrical machine of the hybrid drive. The converter unit also may comprise at least one supplementary module that can be coupled to the basic module. The supplementary module preferably comprises a converter that interacts with a second electrical machine of the hybrid drive. The supplementary module preferably is coupled mechanically to the body structure, electrically to the converter of the electrical energy store and coupled to the cooling circuit for cooling purposes via the basic module. The basic module and the supplementary module are coupled via separate connections individually electrically to that electrical machine with which the respective converter of the basic module or supplementary module interacts. The invention enables integration of plural converters of electrical machines of a hybrid drive in a hybrid vehicle in a space-saving manner.

The basic module may have a cooling element connected to the connections for cooling the converter unit and through which coolant flows. The cooling element cools both the converter of the basic module and the converter of each supplementary module. Thus, the cooling element enables effective cooling of the converter unit.

A supplementary module preferably is coupled to the basic module so that the housings of the modules are connected mechanically in such a way that a connection is produced between interiors of the housings. A pressure compensation valve preferably is assigned to the housing of the basic module. Thus, the interior of the basic module and the interior of each supplementary module coupled to the basic module can be ventilated for pressure compensation purposes via the pressure compensation valve.

An excess pressure built up under unfavorable operating conditions in the interior of the basic module and supplementary module can be compensated for with the aid of the pressure compensation valve.

DETAILED DESCRIPTION OF THE PREFERRED EMBODIMENT

Figure 1:
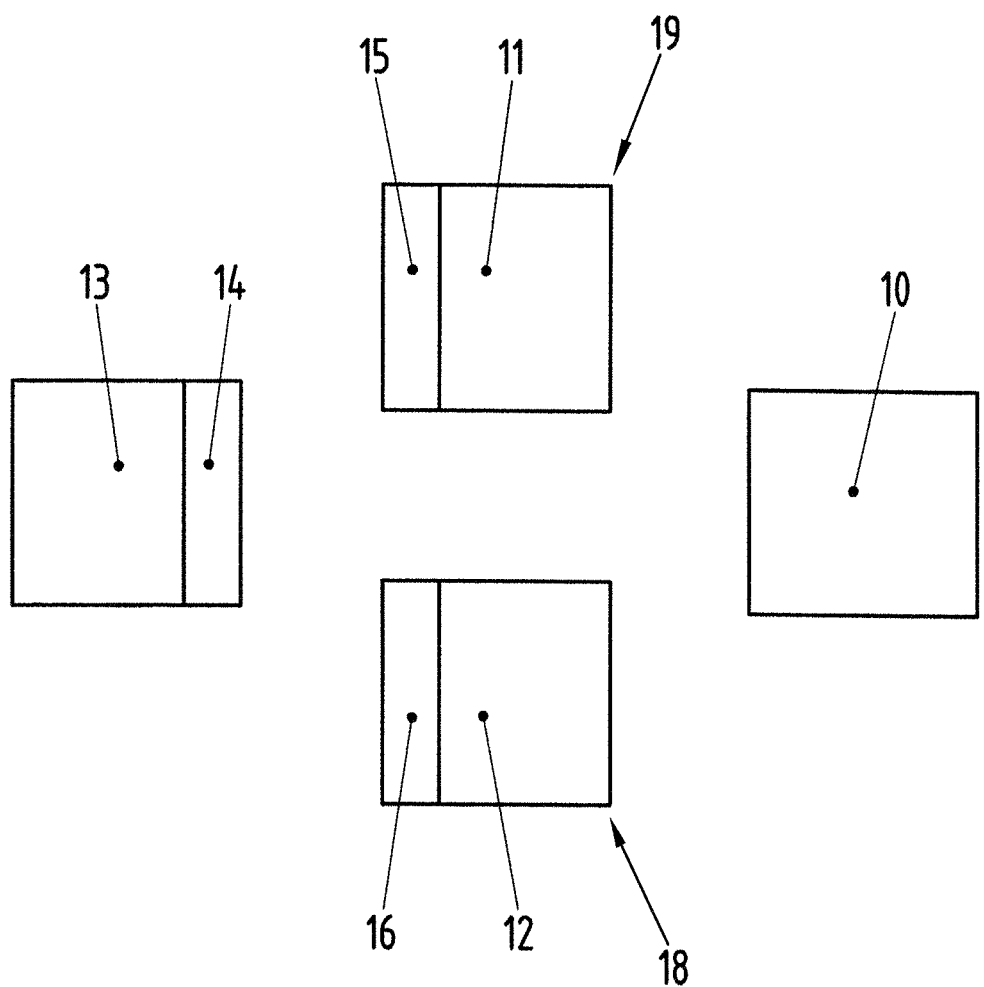
FIG. 1 is a block circuit diagram of a hybrid drive of the invention.

FIG. 1 shows, in very schematized form, a hybrid drive with an internal combustion engine 10 and, in this embodiment, two electrical machines 11 and 12. The hybrid drive furthermore comprises an electrical energy store 13.

The electrical energy store 13 is discharged to a greater extent by the electrical machines 11, 12 when the electrical machines 11, 12 are operated as motors and provide a drive torque at an output drive of the hybrid vehicle. On the other hand, the electrical energy store 13 can be charged to a greater extent by the electrical machines if the electrical machines 11, 12 of the hybrid drive are operated as generators.

A converter 14 is assigned to the electrical energy store 13, as shown in FIG. 1. Furthermore, a converter 15 or 16 is assigned to each of the electrical machines 11, 12.

The invention relates to details of a hybrid drive that make it possible for the converters 15, 16 assigned to the electrical machines 11, 12 to be integrated in the hybrid vehicle in an optimum and space-saving fashion. The converters 15, 16 assigned to the electrical machines 11, 12 interact with the corresponding electrical machines 11, 12, but need not be positioned in the physical vicinity of the respective electrical machines 11, 12.

Figure 2:
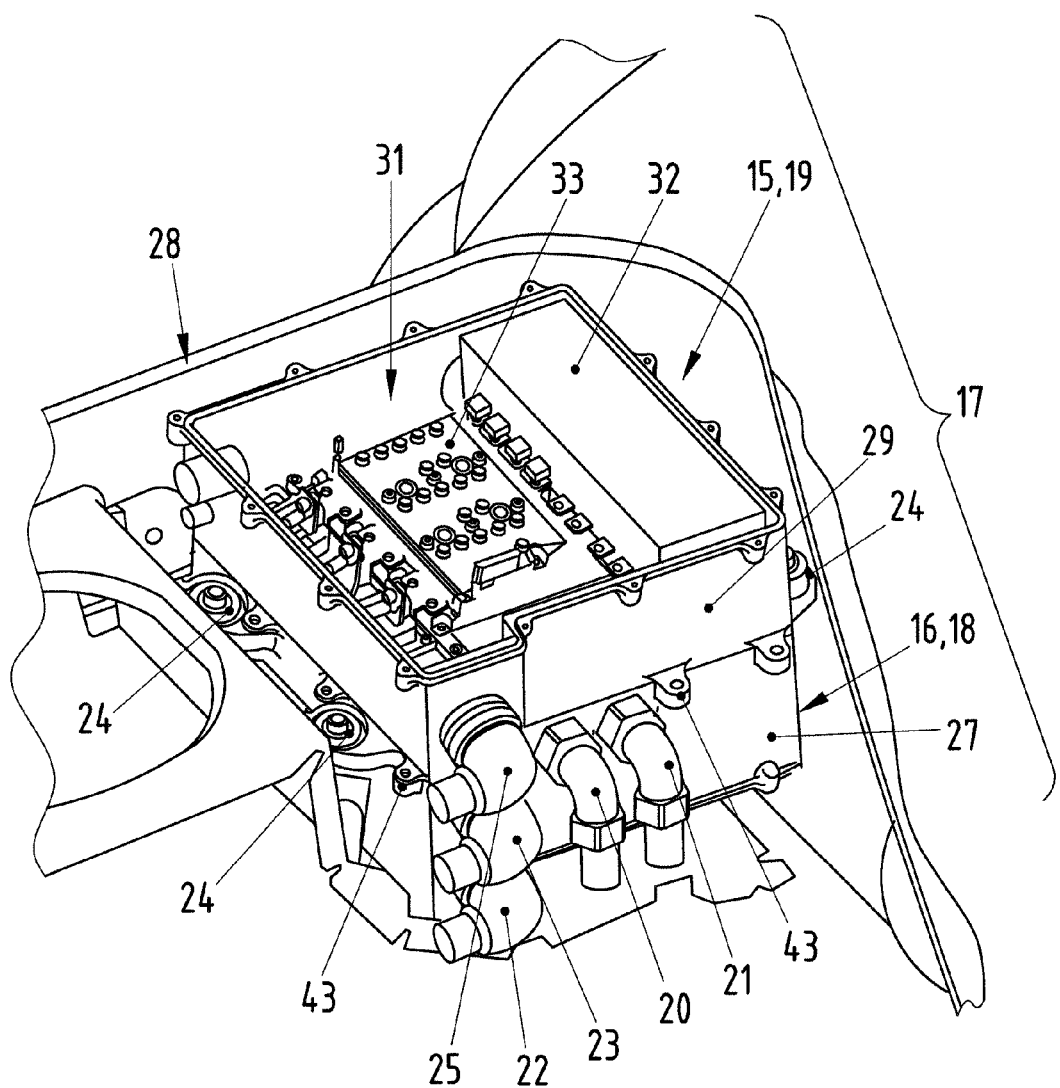
FIG. 2 is a perspective view of a detail of the hybrid drive of the invention together with a section from a body structure.
Figure 3:
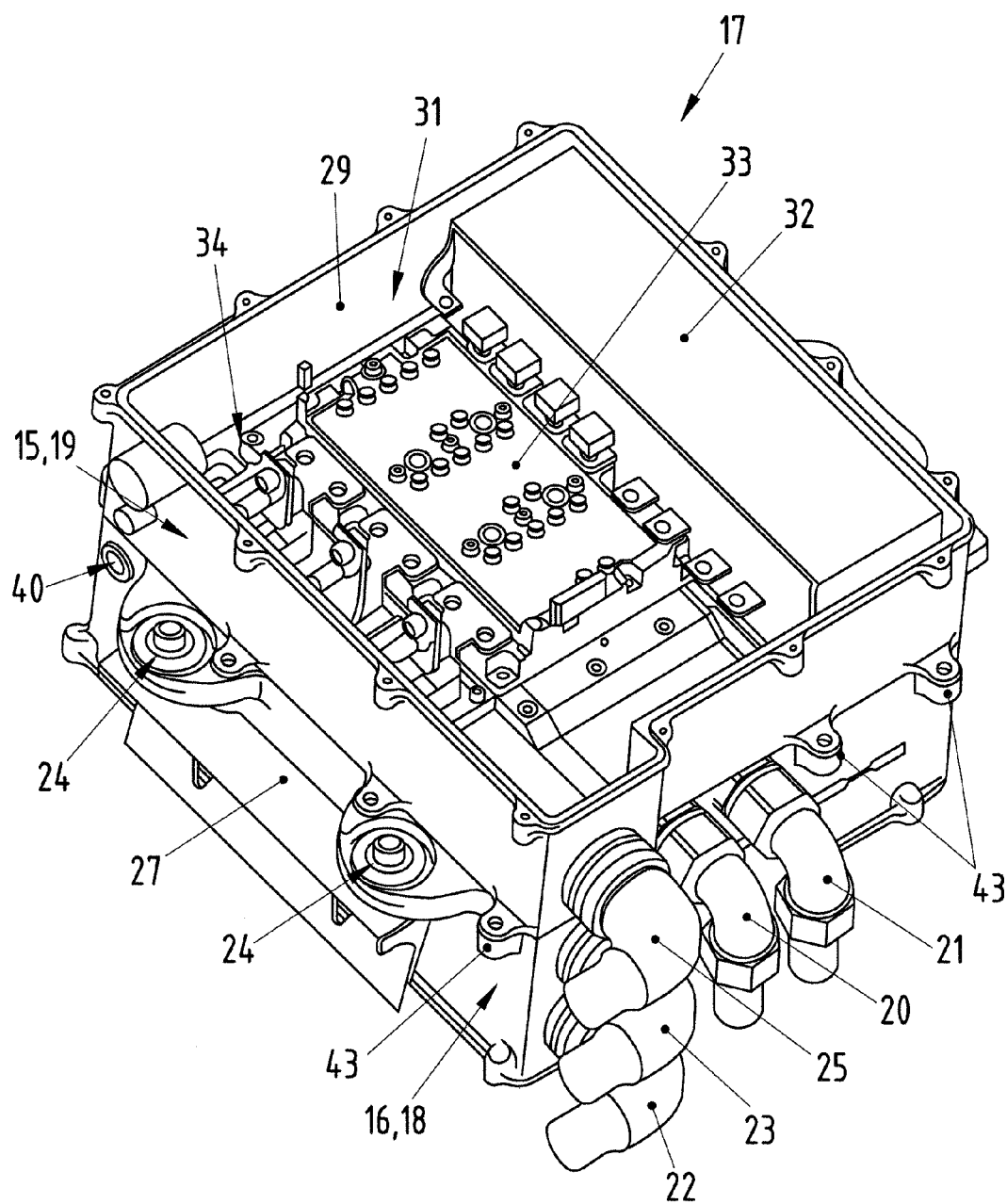
FIG. 3 is a perspective view from above of the detail shown in FIG. 2 without the body structure.
Figure 4:
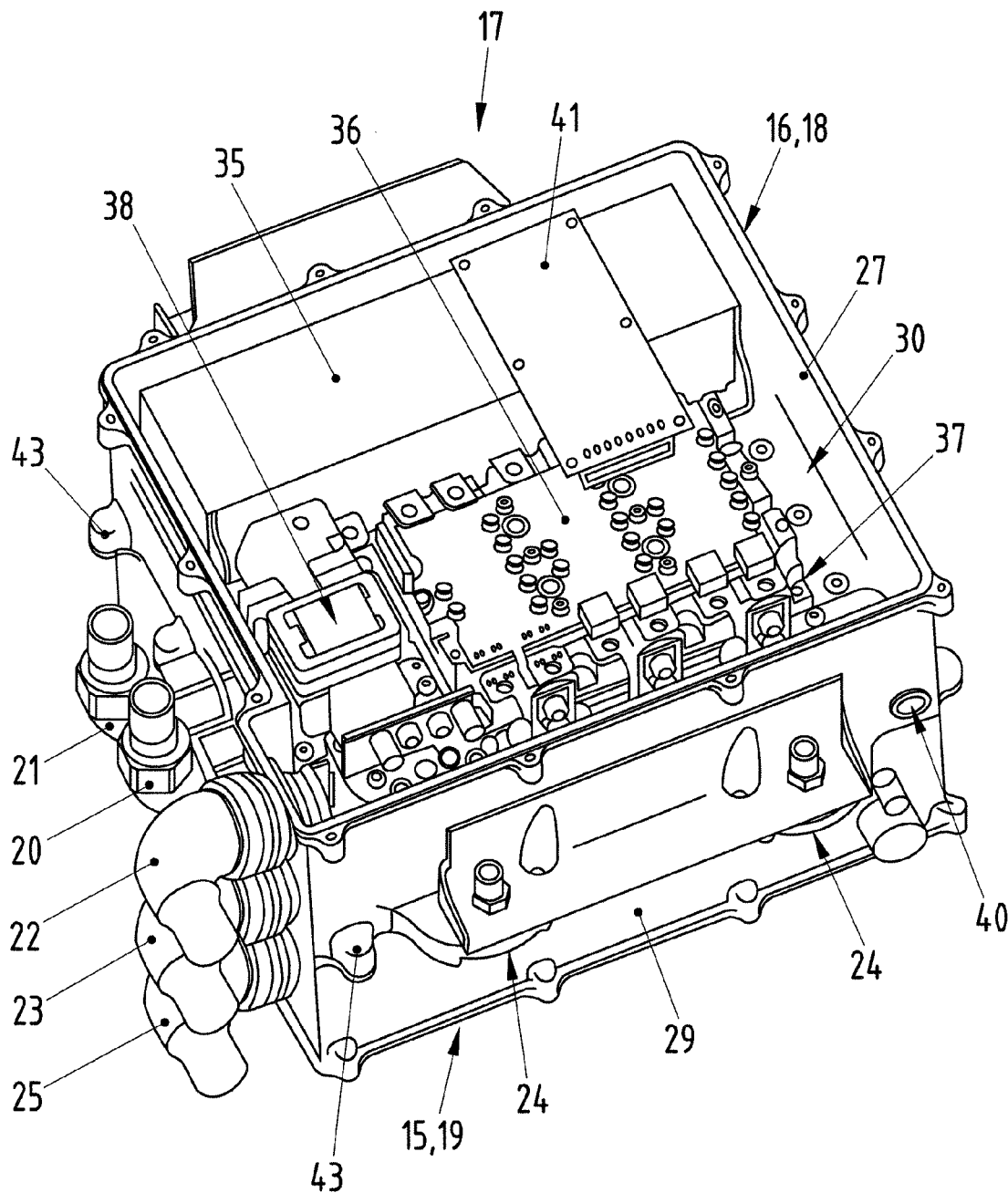
FIG. 4 is a perspective view from below of the detail shown in FIGS. 2 and 3 without the body structure.
Figure 5:
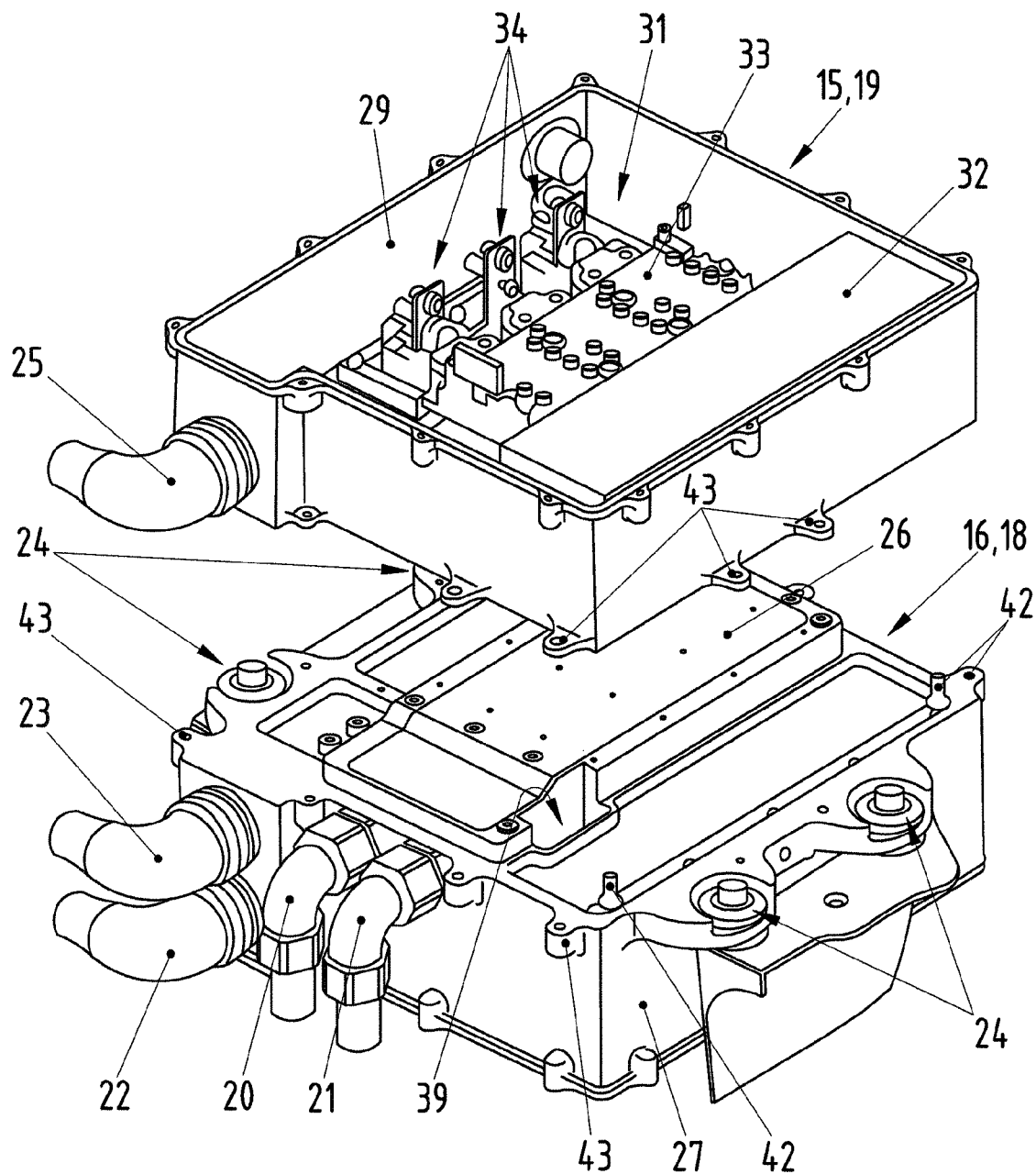
FIG. 5 is a perspective view from above of the detail shown in FIGS. 2, 3 and 4 in a decoupled state.

The converters 15, 16 that are assigned to the electrical machines 11, 12 of the hybrid drive and interact with the electrical machines are combined to form a modular converter unit 17. The modular converter unit 17 is shown in FIG. 2 in an installation on a body structure 28 of a hybrid vehicle, and FIGS. 3 to 5 show the converter unit 17 in different perspective views.

In the illustrated embodiment, the converter unit 17 has a basic module 18 and a supplementary module 19 that is coupled to the basic module 18. The basic module 18 comprises the converter 16, which interacts with the electrical machine 12. The supplementary module 19 comprises the converter 15, which interacts with the electrical machine 11.

The basic module 18 also comprises connections 20, 21 for cooling the converter unit 17. The connection 20 corresponds to a forward flow and the connection 21 corresponds to a return flow for coolant. The modular converter unit 17 can be incorporated in a coolant circuit and cooled via the connections 20, 21 for coolant.

The basic module 18 of the modular converter unit 17 further has a connection 22 for making electrical contact with the converter 14, which is assigned to the electrical energy store 13.

In addition, the basic module 18 of the modular converter unit 17 has a connection 23 for making electrical contact with the electrical machine 12, which interacts with the converter 16 accommodated by the basic module 18.

Furthermore, the basic module 18 of the modular converter unit 17 comprises fastening means 24 for attaching the modular converter unit 17 mechanically to the body structure 28 of the hybrid vehicle. The fastening means 24 preferably comprise dampers for attaching the modular converter unit 17 to the body structure 28 in damping fashion. The dampers can be rubber-elastic elements.

As noted above, the supplementary module 19 is coupled to the basic module 18 and comprises the converter 15 that interacts with the electrical machine 11 and a connection 25 for making electrical contact between the electrical machine 11 and the converter 15 accommodated by the supplementary module 19. The supplementary module 19 of the modular converter unit 17 can be attached mechanically to the body structure 28 via the basic module 18. In addition, the supplementary module 19 can be cooled via the basic module 18. Furthermore, the converter 15, which is accommodated by the supplementary module 19 and interacts with the electrical machine 11, can be coupled to the converter 14 of the electrical energy store 13 via the converter 16 accommodated by the basic module 18.

FIGS. 1 to 5 illustrate a hybrid drive with two electrical machines 11 and 12 and two converters 15 and 16 assigned respectively to the electrical machines 11 and 12. The two converters 15 and 16 are combined to form a modular converter unit 17 that has a basic module 18 and a supplementary module 19. The mechanical attachment of the modular converter unit 17 to a body structure 28, the attachment of the modular converter unit 17 to a cooling circuit and the electrical attachment of the converter unit 17 to the converter 14 of the electrical energy store 13 are performed centrally for all of the converters 15, 16 of the converter unit 17 via the basic module 18. The supplementary modules 19 are coupled to the basic module 18 and coupled electrically to the electrical machine, which interacts with the converter 15 accommodated by the respective supplementary module 19.

As can best be seen from FIG. 5, the basic module 16 has a cooling element 26 coupled to the connections 20, 21 for accommodating a flow of coolant. The cooling element 26 functions to cool the converter 16 of the basic module 18 and also to cool the converter 15 of the supplementary module 19.

The basic module 18 has a housing 27 and the supplementary module 19 has a housing 29. The two housings 27 and 29 of the basic module 18 and the supplementary module 19 are formed respectively with interiors 30 and 31 that accommodate electrical or electronic assemblies, including the converters 15, 16.

More particularly, a capacitor assembly 32, an IGBT assembly 33 and a current measurement assembly 34 having a plurality of current sensors are among the assemblies of the converter 15 positioned in the interior 31 of the housing 29 of the supplementary module 19.

Likewise, a capacitor assembly 35, an IGBT assembly 36 and a current measurement assembly 37 having a plurality of current sensors are among the assemblies of the converter 16 positioned in the interior 30 of the housing 27 of the basic module 18.

Furthermore, a filter 38 is positioned in the interior 30 of the housing 27 of the basic module 18 and is connected between the converter 16 of the basic module 18 and the converter 14 of the electrical energy store 13.

Electrical contact is made between the capacitor assemblies 32 and 35 of the converters 15 and 16 when the supplementary module 19 is coupled to the basic module 18 of the modular converter unit 17 so that the two converters 15, 16 are coupled electrically to one another. The electrical contact between the capacitor assemblies 32 and 35 is made in this case via a leadthrough 39 shown in FIG. 5. Therefore, the interiors 30 and 31 of the basic module 18 and the supplementary module 19 are connected to one another via the leadthrough 39.

A pressure difference is formed during operation as a result of temperature fluctuations in the interiors 30, 31. Accordingly, a pressure compensation valve 40 shown in FIGS. 3 and 4 is assigned to the basic module 18 to compensate for a pressure difference with respect to the ambient pressure. Accordingly, pressure compensation with respect to the ambient pressure can be implemented via the pressure compensation valve 40 when an impermissible excess pressure or negative pressure is produced in the interiors 30, 31 of the basic module 18 and the supplementary module 19.

Furthermore, an insulation monitor 41 (shown in FIG. 4) is assigned to the basic module 18 and can be used to provide short-circuit monitoring for the converter unit 17.

Projections 42 are formed on the housing 27 of the basic module 18 and engage in depressions (not shown) in the housing 29 of the supplementary module 19 for coupling the basic module 18 and the supplementary module 19. The housings 27, 29 can be screwed to one another via fastening sections 43 formed on said housings.

A hybrid drive is likely to have a plurality of electrical machines and, accordingly, a plurality of converters assigned to the electrical machines. The invention makes it possible to integrate the converters that interact with the electrical machines in the motor vehicle in a space-saving and efficient manner.

The basic module 18 of the modular converter unit 17 performs the function of the mechanical attachment to the body structure 28, the attachment to the cooling circuit and the electrical attachment to the converter 14 of the electrical energy store 13, centrally for all of the converters 15, 16 of the converter unit 17. The basic module 18 also is coupled electrically individually to the electrical machine that interacts with the converter 16 accommodated by the basic module 18. Each supplementary module 19 is coupled electrically individually to the electrical machine that interacts with the converter 15 accommodated by the respective supplementary module 19. The electrical coupling of the converter 15 accommodated by the respective supplementary module 19 to the converter 14 of the electrical energy store 13 is performed via the converter 16 of the basic module 18, for which purpose electrical contact is made between the capacitor assemblies 32 and 35 of the converters 15 and 16 of the basic module and the respective supplementary module 19.

What is claimed is:

1. A hybrid drive of a hybrid vehicle, with an internal combustion engine, at least first and second electrical machines and an electrical energy store that is discharged when at least one of the electrical machines is operated as a motor and is charged when at least one of the electrical machines is operated as a generator, a converter being assigned to the electrical energy store, and first and second converters being assigned respectively to the first and second electrical machines, wherein:
  a) the first and second converters assigned to the first and second electrical machines are combined to form a modular converter unit;
  b) the modular converter unit having a basic module with the first converter assigned to a first electrical machine, connections for cooling the converter unit, fastening means for attaching the converter unit to a body structure, a connection for making electrical contact with the converter assigned to the electrical energy store, and a connection for making electrical contact with the first electrical machine;
  c) the modular converter unit further has at least one supplementary module that can be coupled to the basic module, the supplementary module having the second converter which is assigned to a second electrical machine and a connection for making electrical contact with the second electrical machine, the supplementary module further being capable of being coupled to the basic module so that the respective supplementary module can be cooled via the basic module, can be attached to the body structure via the basic module and can be coupled electrically to the converter of the electrical energy store via the basic module.

2. The hybrid drive of claim 1, wherein the basic module has fastening means with dampers for attaching the converter unit in damping fashion to the body structure.

3. The hybrid drive of claim 1, wherein the basic module has a cooling element connected to the connections and accommodating a flow of coolant for cooling the converter unit of the basic module and the converter of the supplementary module.

4. The hybrid drive of claim 1, wherein the supplementary module and the basic module have housings that are connected mechanically so that a connection is produced between interiors of the housings.

5. The hybrid drive of claim 4, further comprising a pressure compensation valve assigned to the housing of the basic module and ventilating the interior of the basic module and the interior of the supplementary module that is coupled to the basic module for achieving pressure compensation.

* * * * *